United States Patent
Su et al.

(10) Patent No.: US 8,724,750 B2
(45) Date of Patent: May 13, 2014

(54) ADJACENT CHANNEL REJECTION OF A CCK BLOCKER

(75) Inventors: Chi-Lin Su, Hsinchu (TW); Ning Zhang, Saratoga, CA (US)

(73) Assignee: Qualcomm Incorporated, San Diego, CA (US)

( * ) Notice: Subject to any disclaimer, the term of this patent is extended or adjusted under 35 U.S.C. 154(b) by 548 days.

(21) Appl. No.: 12/979,943

(22) Filed: Dec. 28, 2010

(65) Prior Publication Data

US 2012/0163415 A1    Jun. 28, 2012

(51) Int. Cl.
*H03D 1/04* (2006.01)
(52) U.S. Cl.
USPC ............ 375/346; 375/144; 375/148
(58) Field of Classification Search
USPC ............ 375/285, 346–350, 144, 148; 455/1, 455/63.1, 114.2, 278.1, 296; 329/318, 320, 329/349
See application file for complete search history.

(56) References Cited

U.S. PATENT DOCUMENTS

| | | | |
|---|---|---|---|
| 6,785,523 B2 | 8/2004 | Husted et al. | |
| 7,386,063 B1 | 6/2008 | Husted | |
| 7,388,063 B2 * | 6/2008 | Zanghellini | 526/317.1 |
| 2008/0226001 A1 * | 9/2008 | Geng et al. | 375/350 |

FOREIGN PATENT DOCUMENTS

EP    1780915    5/2007

OTHER PUBLICATIONS

Partial International Search Report—PCT/US2011/067046—ISA/EPO—May 31, 2012.
International Search Report and Written Opinion—PCT/US2011/067046—ISA/EPO—Feb. 27, 2013.

* cited by examiner

*Primary Examiner* — Dac Ha
*Assistant Examiner* — Janice Tieu
(74) *Attorney, Agent, or Firm* — Holland & Hart LLP (57) ABSTRACT

An adjacent channel interference rejection mechanism is provided to detect and reject CCK-modulated signals from an adjacent channel in a wireless communication receiver. Replicas of the baseband signals are frequency-shifted and then analyzed through a series of correlations to compare the power of the correlation outputs. An adjacent channel interference of a CCK-modulated signal is determined and rejected based on the comparisons meeting a predetermined tolerance level.

20 Claims, 9 Drawing Sheets

ADJACENT CHANNEL REJECTION OF A CCK BLOCKER

BACKGROUND

Embodiments of the inventive subject matter generally relate to the field of wireless communication systems, and, more particularly, to techniques for mitigating adjacent channel interference.

The demand for wireless devices and services in the same unlicensed spectrum has increased the radio frequency interference for IEEE 802.11 devices. This interference can be caused by adjacent channel interference (ACI) caused by side band emissions from a signal in an adjacent channel. This interference limits the capacity and performance of a wireless communication system.

The problem of ACI is prevalent in the 2.4 GHz unlicensed spectrum where overlapping channels are used. The IEEE 802.11g standard allows for OFDM transmissions to operate within the same ISM frequency band, 2.4 GHz-2.435 GHz, as the IEEE 802.11b direct-sequence-spread-spectrum ("DSSS") transmissions. The ISM frequency band is divided into 14 partially overlapping channels with each channel being 22 MHz wide and 5 MHz apart. Typically, filtering is used to minimize adjacent channel interference. However, there are times when filtering is not effective at reducing this interference and the side band energy falls within the pass band of a wireless receiver. With the increase in demand for IEEE 802.11g compliant wireless devices, adjacent channel interference will be a limiting factor for achieving reliable communications and performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments are disclosed of an apparatus and method for performing detection and rejection of an adjacent channel interference within a CCK-modulated signal in a receiver of a wireless communication device. In an embodiment, an IEEE 802.11g compliant receiver detects a baseband signal by both a CCK detector and an OFDM detector simultaneously to identify the modulation type of the baseband signal.

The CCK detector has a Barker correlator that correlates the baseband signal with a known sequence of Barker codes. The CCK detector also analyzes the baseband signal as a possible interference from an adjacent channel, referred to as a CCK blocker. In some embodiments, a CCK blocker is detected from a comparison of the amplitude of the correlation outputs produced from frequency-shifted replicas of the baseband signal (e.g. 0 MHz, 5 MHz, and −5 MHz). The amplitude of each correlation output is used to determine where the peak amplitude lies within the frequency-shifted band. If the amplitude of the correlation output of the 0 MHz signal (i.e., baseband signal) is smaller than the amplitude of the correlation output of the +5 MHz or that of the −5 MHz signal within a certain tolerance level, then the baseband signal is quickly rejected as being a CCK blocker.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Wireless receivers work in less than ideal environments, including environments having externally and internally generated interfering RF signals. A wireless receiver detects the possibility of the transmission of a packet by a significant increase in the power level of a received RF signal. However, the power level increase may also be due to an interfering signal. An interfering signal can cause a receiver to falsely detect a packet thereby missing an intended transmission or delaying the receipt of a transmission. As such, it is advantageous for a wireless receiver to detect and reject an interfering signal quickly.

An IEEE 802.11g-compliant receiver does not know which type of packet is arriving and as such, needs to quickly determine the packet type in order to decode the transmission. The IEEE 802.11g standard supports direct-sequence spread spectrum (DSSS) modulation (802.11b) at 1 and 2 Mbps, complementary coding keying (CCK) modulation (802.11b) at 5.5 and 11 Mbps, and OFDM modulation at 6, 9, 12, 18, 24, 36, 48, and 54 Mbps.

A CCK-modulated packet has a preamble that is used to receive the signal and to synchronize itself with the transmitter. The CCK preamble is a series of Barker-11 code word sequences transmitted at a chip rate of 11 MHz. The preamble is Barker correlated and then demodulated based on the preamble format (e.g., long or short preamble format) in order to recover the rest of the transmission. The preamble has a fundamental period of 1 us. In order to achieve the highest throughput, the receiver needs to detect the preamble within 15 us of its arrival.

An 802.11g-compliant receiver detects a signal in parallel in order to ensure the fastest decoding time possible. A baseband signal is correlated by both a Barker correlator, for CCK signal detection, and an autocorrelator, for OFDM signal detection, simultaneously. The CCK detector correlates known patterns in the preamble of the baseband signal with a sequence of Barker code words. The correlation output is compared to a predetermined threshold for CCK modulation. If the correlation output exceeds the threshold, then the baseband signal is identified as a CCK-modulated transmission.

In addition, the CCK detector analyzes if the baseband signal is a CCK blocker. A CCK blocker is an interference caused by emissions from a CCK-modulated signal in an adjacent channel. A CCK blocker is detected by comparing the amplitude of a correlated output on frequency-shifted replicas of the baseband signal (e.g., 0/+5 MHz/−5 MHz). In an embodiment, the correlated output is the result of an auto-correlation of a Barker correlation. If the amplitude of the correlated output of the 0 MHz signal is smaller than the amplitude of the correlated output of the +5 MHz or that of the −5 MHz signals within a predetermined tolerance level, then the baseband signal is quickly rejected.

Attention now turns to a description of embodiments of the architecture of a receiver employing techniques for mitigating adjacent channel interference.

Figure 1:
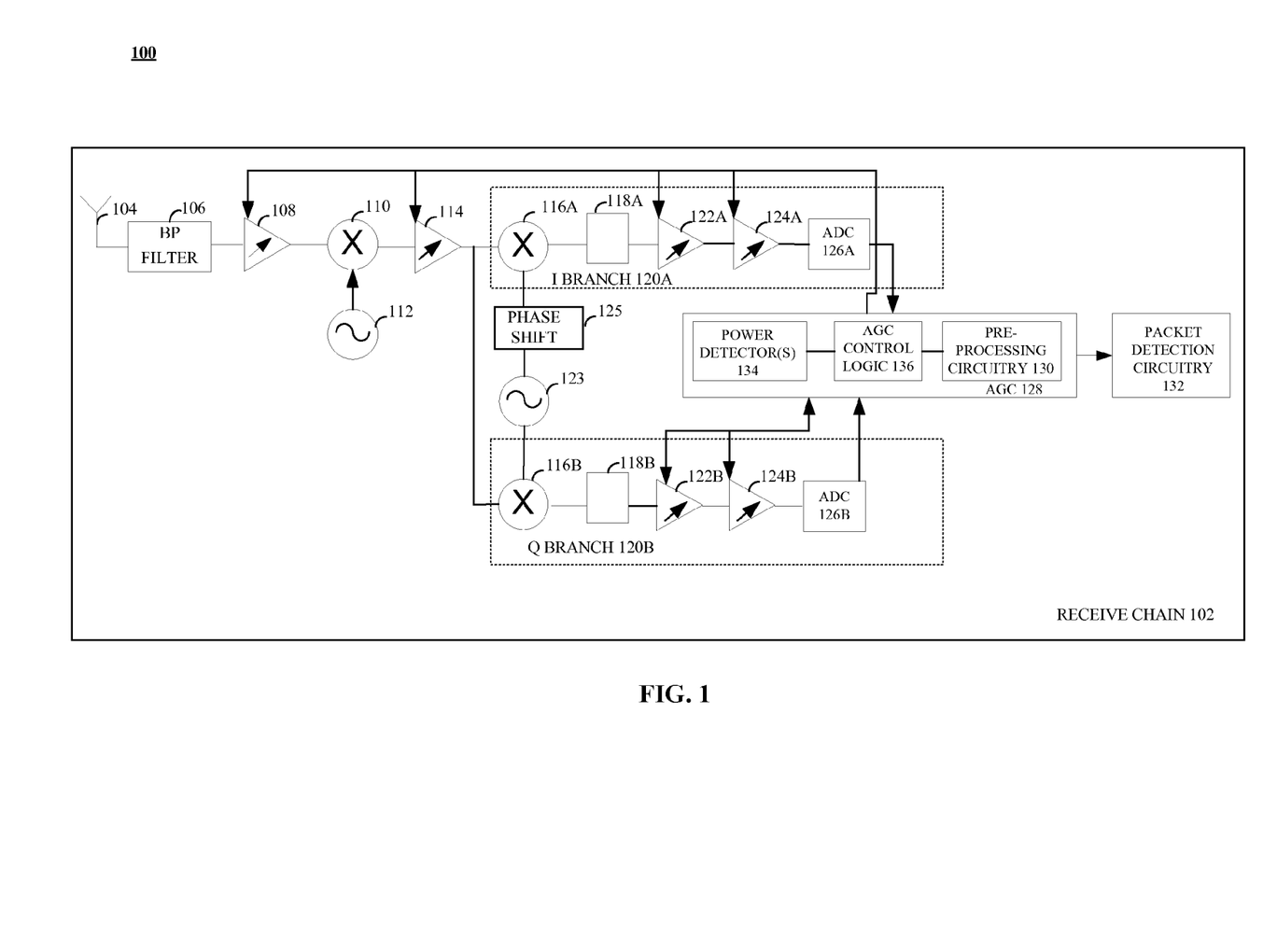
FIG. 1 is an exemplary block diagram of a single stream mode receiver operable to implement a technique for adjacent channel rejection.

FIG. 1 illustrates an exemplary single stream mode receiver 100 for receiving signals in a wireless environment, such as a wireless local area network (WLAN). The receiver 100 can be incorporated into an integrated chip as part of a wireless LAN card or as part of an access point (AP). As shown in FIG. 1, the receiver 100 has a receive chain 102 including an antenna 104 capable of receiving signals within the frequency of service (e.g., 2.4 GHz). In one embodiment, the receiver is configured to conform to the 802.11g standard and receive signals within the 2.4 GHz frequency band.

A bandpass filter 106 receives incoming signals from an antenna 104 and outputs a predetermined band of frequencies while excluding those frequencies higher and lower than the predetermined band. A variable RF amplifier 108 can provide an initial amplification to that predetermined band of frequencies. A mixer 110 mixes the signal with a signal from a RF oscillator 112 supplied to the RF mixer 110 to generate intermediate frequency (IF) signals, which are then amplified by an IF amplifier 114.

The amplified IF signals are supplied to an in-phase (I) mixer 116a and a quadrature (Q) mixer 116b, respectively. A quadrature mixer 116b is directly driven by a local oscillator 123, and the in-phase mixer 116a is driven by the local IF oscillator signal after it is phase shifted by a 90 degree phase shifter 125. In this way, the in-phase (I) and quadrature (Q) components of the received RF signal are obtained at the outputs of the in-phase mixer 116a and the quadrature mixer 116b, respectively.

At this point, mixers 116a,b and low pass filters 118a,b, including both I and Q branches 120a, 120b, can generate signals in the desired channel. Two pairs of a series of amplifiers 122a,b, 124a,b then amplify the respective signals.

Analog to digital converters (ADCs) 126a,b, for both I and Q branches 120a,b, transform the amplified signals into digital signals, referred to herein as baseband signals that are further analyzed. The automatic gain control (AGC) circuit 128 detects the magnitude of the baseband signal, as measured by power detector 134, and uses the detected magnitude to adjust the gains of RF amplifier 108, IF amplifier 114, and amplifiers 122a,b, 124a,b.

There are one or more power detectors 134 that receive signals from the ADCs 126a,b and generate power measurements of the baseband signal. The AGC control logic 136 receives these power measurements and uses them to adjust the gain settings of RF amplifier 108, IF amplifier 114, and each of amplifiers 122a,b, 124a,b.

The AGC 128 attempts to identify the baseband signal as an in-band signal using strong signal and weak signal detection techniques. If a signal is found, the detection process is complete and the packet detection circuitry 132 continues further processing of the transmission. Otherwise, the detection process is repeated on the next portion of the baseband signal. Weak signal detection and strong signal detection are independent and complementary features. Strong signal detection is determined when there is an in-band signal detected and the signal power is larger than a threshold. The in-band signal is detected by checking the ratio of the power of the filtered signal to the ADC power. Weak signal detection is used for baseband signals that occupy less time in the AGC, and that can spend more time in packet detection to achieve more accuracy. A baseband signal is detected by strong signal detection and weak signal detection simultaneously and the outcome depends on which technique makes the determination first.

The AGC 128 must adjust receiver gains so that the signal can be properly quantized by the respective ADCs 126a,b. If the signal is too large at the ADC input, the signal will be distorted by saturation. If the signal is too small at the ADC input, the quantization noise of the ADCs 126a,b will render the signal-to-noise (SNR) ratio too low for correction detection.

The pre-processing circuitry 130 uses strong signal and weak signal detection techniques to determine the presence of a packet. At the input point of the pre-processing circuitry 130, the receiver 100 does not know the type of the modulation scheme of the baseband signal or if the baseband signal is a CCK blocker. An IEEE 802.11g-compliant receiver has to recognize both CCK-modulated and OFDM-modulated signals. Once the modulation type of the baseband signal is found via the weak or strong signal detection techniques, the packet detection circuitry 132 uncovers and interprets the unknown bits of the packet. The data bits are then transmitted to other components (not shown) for further processing.

Figure 2:
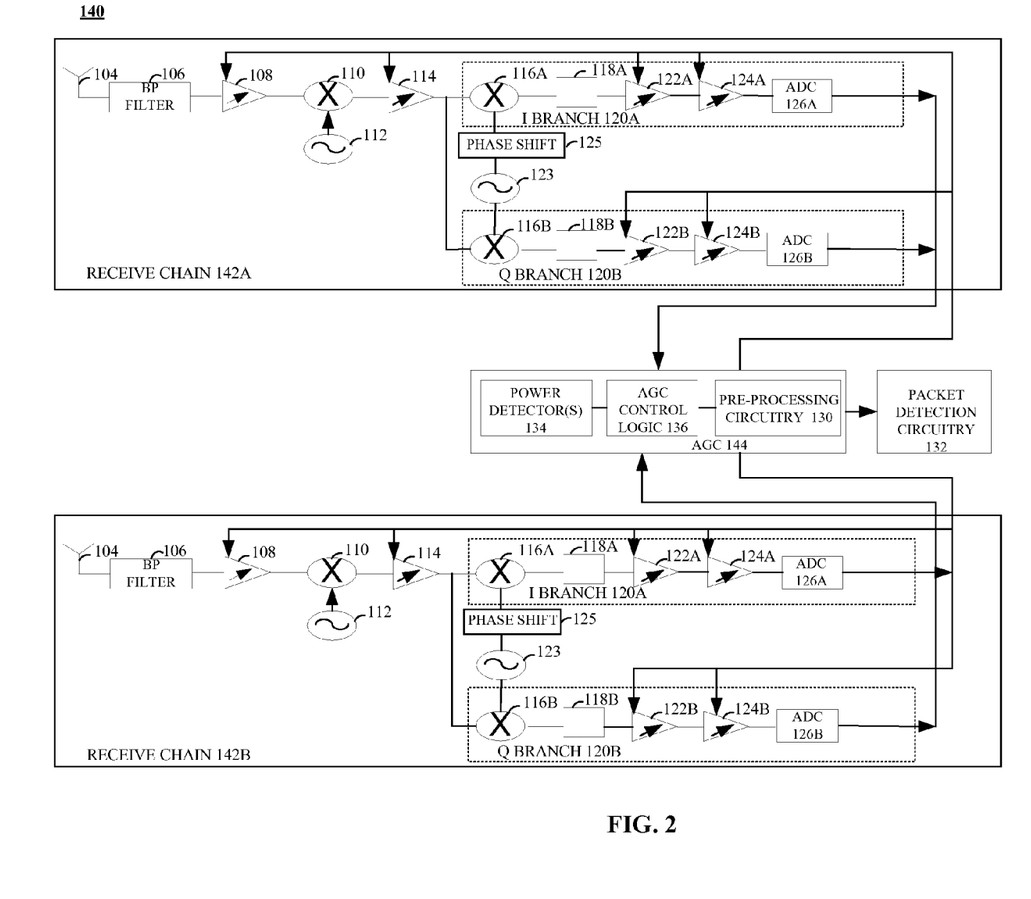
FIG. 2 is an exemplary block diagram of a multiple antenna receiver operable to implement a technique for adjacent channel rejection.

FIG. 2 illustrates an exemplary multiple antenna receiver 140 for receiving signals in a wireless environment. A receiver having multiple antennas is used so that in the event of poor signal reception due to fading on one antenna, a good signal with no fading will likely exist on another channel. Although there are two antennas shown in FIG. 2, it should be noted that the technology described herein is not constrained to two antennas and can be applied to a multiple antenna receiver having any number of antennas.

As shown in FIG. 2, the receiver 140 has two receive chains 142a,b. Each receive chain 142a,b contains an antenna 104 coupled to a bandpass filter 106 that receives incoming signals from the antenna 104 and outputs a predetermined band of frequencies while excluding those frequencies higher and lower than the predetermined band. A variable RF amplifier 108 can provide an initial amplification to the predetermined band of frequencies. A mixer 110 mixes the signal with a signal from a RF oscillator 112 supplied to the RF mixer 110 to generate intermediate frequency (IF) signals, which are then amplified by an IF amplifier 114.

The amplified IF signals are supplied to an in-phase (I) mixer 116a and a quadrature (Q) mixer 116b, respectively. A quadrature mixer 116b is directly driven by a local oscillator 123, and the in-phase mixer 116a is driven by the local IF oscillator signal after it is phase shifted by a 90 degree phase shifter 125. Mixers 116a,b and low pass filters 118a,b, including both I and Q branches 120a, 120b, can generate signals in the desired channel. Two pairs of series amplifiers 122a,b, 124a,b then amplify the respective signals. Analog to digital converters (ADCs) 124a,b, for both I and Q branches 120a,b, transform the amplified signals into digital baseband signals that can be further analyzed.

The automatic gain control (AGC) circuit 144 detects the magnitude of the signal from each chain and uses the detected magnitude to adjust the gains of each RF amplifier 108, IF amplifier 114, and amplifiers 122a,b, 124a,b in each respective receive chain 142a,b. The signals from all chains are combined after auto-correlation of the barker correlation in pre-processing circuitry 130 to achieve co-phase combining easily for packet detection.

Figure 3:
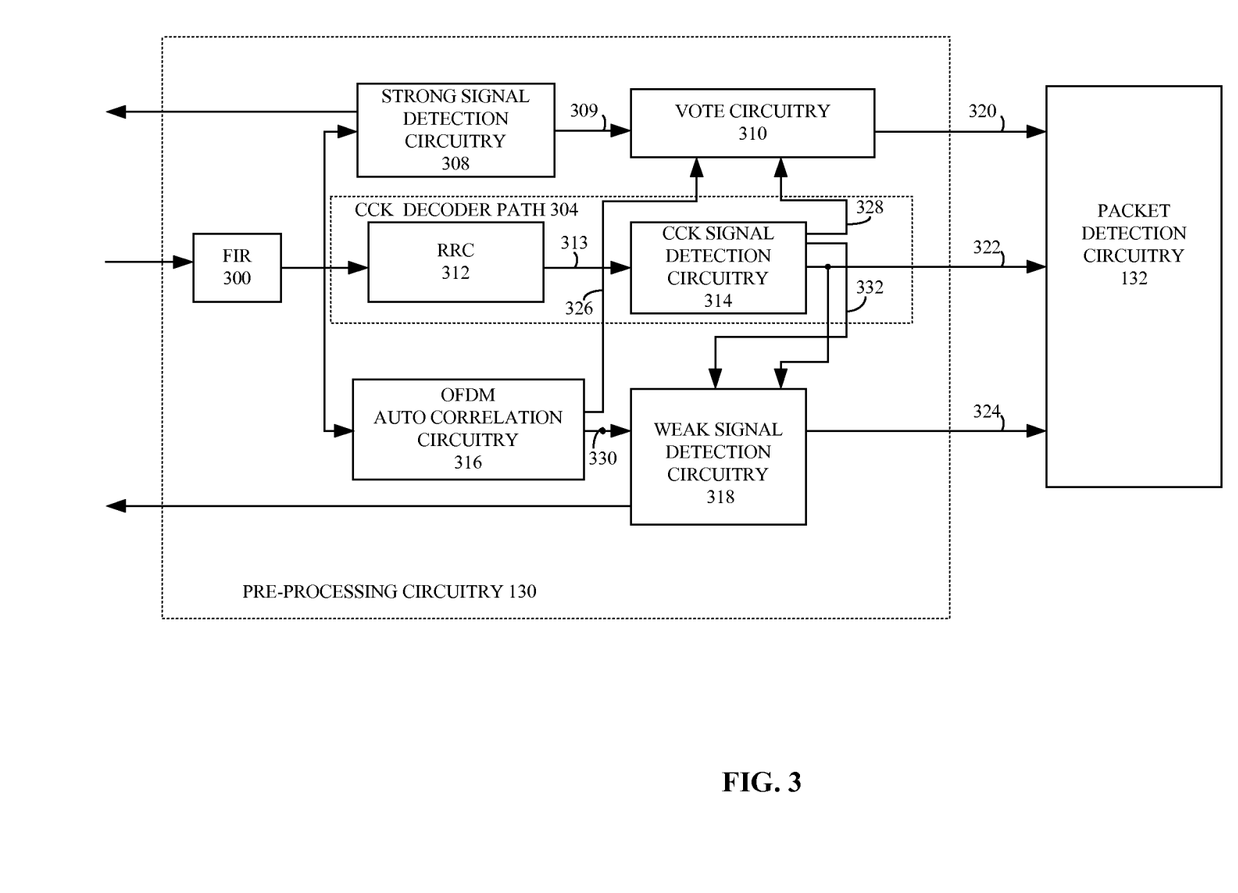
FIG. 3 is an exemplary block diagram of a pre-processing circuitry operable to implement a technique for adjacent channel rejection.

FIG. 3 illustrates an exemplary pre-processing circuitry 130 that analyzes the output of the ADCs 126. The baseband signal is detected by strong signal detection circuitry 308, a CCK decoder path 304, and an OFDM autocorrelation unit 316. First, the data sampling rate is reduced from 80 MHz to 44 MHz through the use of a finite impulse response (FIR) filter 300. The strong signal detection circuitry 308 is used to detect a strong signal thereby necessitating a reduction in the received power of the amplifiers 108, 114, 122, 124 in the receive chain(s) 102,142.

The CCK decoder path 304 determines if the baseband signal is a CCK-modulated signal and/or a CCK blocker. A CCK blocker is a CCK-modulated signal from an adjacent channel. The CCK blocker is quickly detected and rejected. The OFDM auto correlation unit 316 detects whether the baseband signal is an OFDM-modulated signal.

The strong signal detection circuitry 308 detects whether the baseband signal strength exceeds an expected maximum threshold over the average background noise. A sudden change in power triggers the AGCs 128, 144 to reduce the amplifier gain so that the size of the baseband signal is forced to fall within one or more predefined thresholds. The receiver 100, 140 needs to adjust the receive gains so that the signal can be properly quantized by the ADCs 126. If this signal is too big at the ADC input, the signal will be distorted by saturation. If the signal is too small at the ADC input, the quantization noise of the ADC 126 will render the baseband signal-to-noise ratio too low for correct detection. There are many techniques that the strong signal detection circuitry 308 can utilize to detect a strong signal and any of the strong signal detection techniques described in the U.S. Pat. No. 6,785,523, entitled "Self-Correlation Detection in Automatic Gain Calibration," issued to Atheros Communications, Inc. on Aug. 31, 2004, which is hereby incorporated by reference, can be used.

The vote circuitry 310 is used to determine the modulation type of a baseband signal when an indicator 309 is set by the strong signal detection circuitry 308. Identification values 326, 328 are provided to the vote circuitry 310 from the CCK decoder path 304 and the OFDM autocorrelation unit 316 from which the vote circuitry 310 determines the most probable modulation type. An identification value 326 is provided to the vote circuitry 310 from the OFDM autocorrelation unit 316 and an identification value 328 is provided from the CCK decoder path 304. This allows packet detection 132 to use the correct decoder to decode the baseband signal.

The identification values 326, 328 are based on the characteristics of the type of modulation. Specifically, each type of modulation has inherent characteristics that can be used when searching for a packet. The inherent characteristics could be found by a self-correlating technique (e.g., identifying unique signal patterns provided within the packet corresponding to a particular type of modulation), a cross-correlating technique (e.g., comparing signals in a packet to a known pattern identified for a type of modulation), a Barker-correlating technique (e.g., identifying Barker sequences of code words within the preamble of a packet) or a combination of any of these correlating techniques. The vote circuitry 310 uses the identification values 326, 328 to determine the more probable type of modulation. In an embodiment, the identification value 326 from the OFDM autocorrelation circuitry can be the baseband's received signal strength indication (RSSI) generated from the autocorrelation output produced from the OFDM autocorrelation circuitry 316. The identification value of the CCK signal 328 can be the RSSI of the Barker correlation output produced from the CCK signal detection circuitry 314. The identification values can be configured and processed using techniques described in U.S. Pat. No. 7,386,063, entitled "Voting Block For Identifying WLAN Signal Modulation Type," issued to Atheros Communications, Inc. on Jun. 10, 2008, which is hereby incorporated by reference.

The CCK decoder path 304 includes a root-raised-cosine (RRC) decimation filter 312 and the CCK signal detection circuitry 314. The RRC filter 312 is used to provide a down sample of 2 to the output of FIR 300. The RRC filter 312 is used when the sampling rate is 44 MHz and the desired sampling rate for CCK signals is 22 MHz. The RRC FIR filter 312 can be used to also provide a matched filter pulse shaping and rejection of out-of-band interference for optimal signal-to-noise ratio (SNR). After this processing, the RRC filter 312 provides a 22 MHz signal to the CCK signal detection circuitry 314.

The CCK signal detection circuitry 314 performs Barker correlation to initially qualify the baseband signal as possibly containing an 802.11b-type packet having a preamble comprising Barker code words. The use of Barker correlation and an amplitude calculation despreads the 802.11b packets across the frequency band so that high correlation results are achieved. The amplitude of the Barker correlation output 332 is provided to the weak signal detection circuitry 318. The maximum baseband signal strength indication (RSSI) of barker correlation output 328 is sent to vote circuitry 310. If there are multiple receiver chains, the maximum ratio combining (MRC) or equal gain combining (EGC) for the autocorrelation of the Barker correlation outputs can be used which increases the packet detection SNR.

In addition, the CCK signal detection circuitry 314 determines whether the baseband signal is a CCK blocker. The CCK signal detection circuitry 314 generates a not_blocker signal 322 that is used to indicate whether or not the baseband signal is a CCK blocker. The not_blocker signal 322 is transmitted to the weak signal detection circuitry 318 and to the packet detection circuitry 132.

The OFDM auto-correlation circuitry 316 performs auto- or self-correlation to identify the signal as possibly containing an OFDM preamble. An OFDM preamble includes twelve tones or complex sinusoidal signals spaced, peak-to-peak, at 1.25 MHz with a period of 0.8 us. Each of ten short training symbols in the OFDM preamble has the twelve subcarriers, thereby establishing an OFDM pattern. The auto-correlation circuitry 316 looks for a periodicity of 0.8 us to find the preamble and auto-correlates to detect the OFDM pattern.

The OFDM autocorrelation circuitry 316 produces a RSSI of the autocorrelation output 326 (i.e., identification value) that is sent to the vote circuitry 310. The power of the autocorrelation output 330 can be provided to the weak signal detection circuitry 318. If there are multiple receive chains, maximum ratio combining (MRC) or equal gain combining (EGC) can be used to determine the power of the autocorrelation outputs. The MRC and EGC techniques are used to increase the detection SNR.

The weak signal detection circuitry 318 receives the correlation results of the OFDM auto-correlation 316 and the CCK signal detection circuitry 314 and compares them to respective predetermined thresholds. If the respective threshold is not exceeded, then the receiver returns to searching and one or more gain adjustments can be performed on the variable amplifiers 108, 114, 122, 124. Otherwise, the signal is detected by the weak signal detection circuitry 318 and the receiver continues with fine AGC adjustments if necessary and decodes the packet.

The packet detection circuitry 132 receives the output of the vote circuitry 310, the not_blocker signal 322, and the output of the weak signal detection circuitry 324 and informs the receiver to decode the rest of the packet in accordance with these inputs which is discussed in more detail below.

Figure 4:
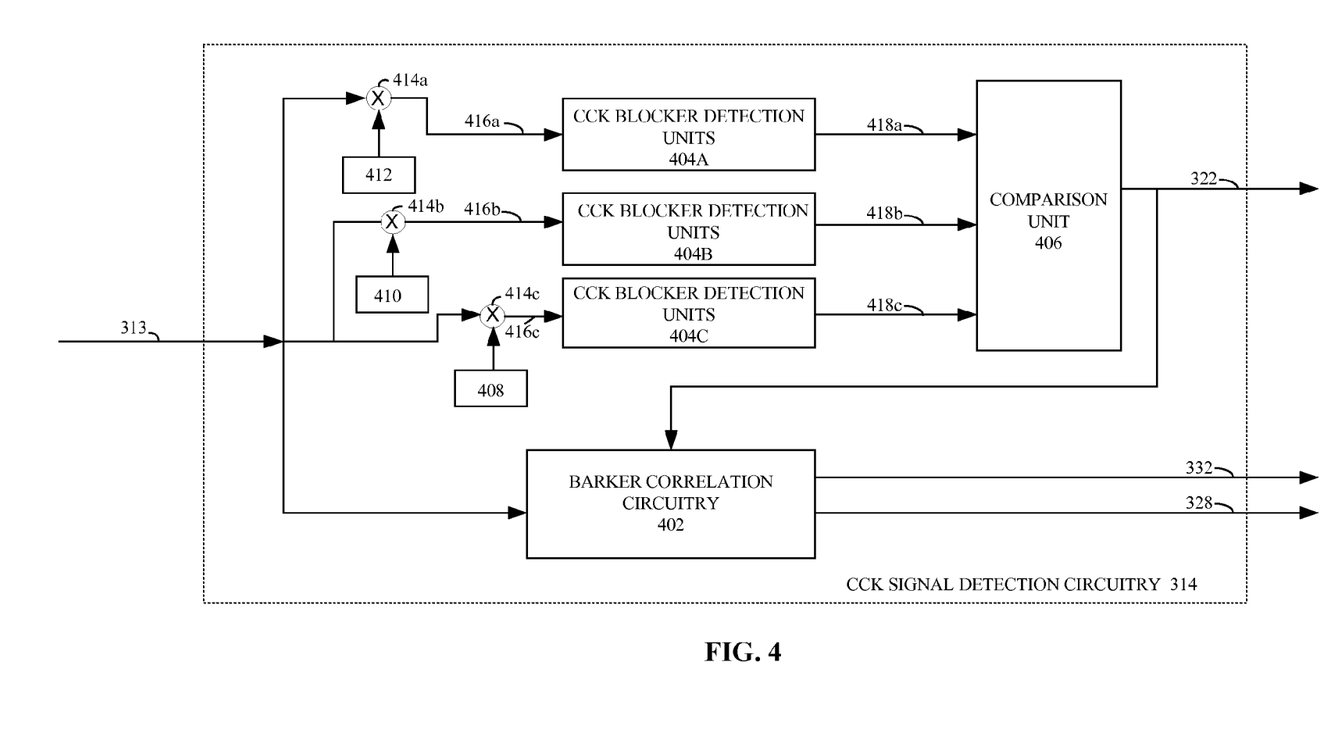
FIG. 4 is an exemplary block diagram of the CCK signal detection circuitry shown in FIG. 3.

FIG. 4 illustrates an exemplary block diagram of the CCK signal detection circuitry 314 in further detail. The baseband signal is processed simultaneously by Barker correlation circuitry 402, to determine if the baseband signal is a CCK-modulated signal, and three CCK blocker detection units 404a-c, to determine if the baseband signal is a CCK blocker. The Barker correlation circuitry 402 correlates samples of the baseband signal to qualify the signal as possibly containing an 802.11b-type packet having a preamble comprising Barker code words. The correlation results 328, 332 are sent to the vote circuitry 310 and the weak signal detection circuitry 318 respectively.

The baseband signal is frequency shifted by 0 MHZ, +5 MHz, and −5 MHz respectively to determine whether the baseband signal is a CCK blocker. Each of the frequency-shifted signals is processed by a respective CCK blocker detection unit 404 that Barker correlates a respective frequency-shifted signal in order to determine its corresponding power. A comparison unit 406 compares these signals 418a-c to detect a CCK blocker. In an embodiment, the comparison unit 406 identifies a CCK blocker if the amplitude of the correlation of the Barker correlation of the 0 MHz signal is not within a predetermined tolerance of the center of the frequency band.

The output 313 of the RRC 312 is frequency shifted by +5 MHz using frequency shifter 412 and mixer 414a, frequency shifted by 0 MHz using frequency shifter 410 and mixer 414b, and frequency shifted by −5 MHz using frequency shifter 408 and mixer 414c. The frequency shifters 408, 410, 412, can be any type of frequency shifting mechanism, such as, mixer/filter or heterodyne.

Each shifted signal 416a-c is filtered and correlated by a respective CCK blocker detection circuitry 404 that generates a respective amplitude of the correlation signal 418a-c indicating the peak amplitude of the correlation of the frequency-shifted signal. A comparison unit 406 compares the signals 418a-c to a predetermined threshold that indicates whether or not the baseband signal is a CCK blocker.

Figure 5:
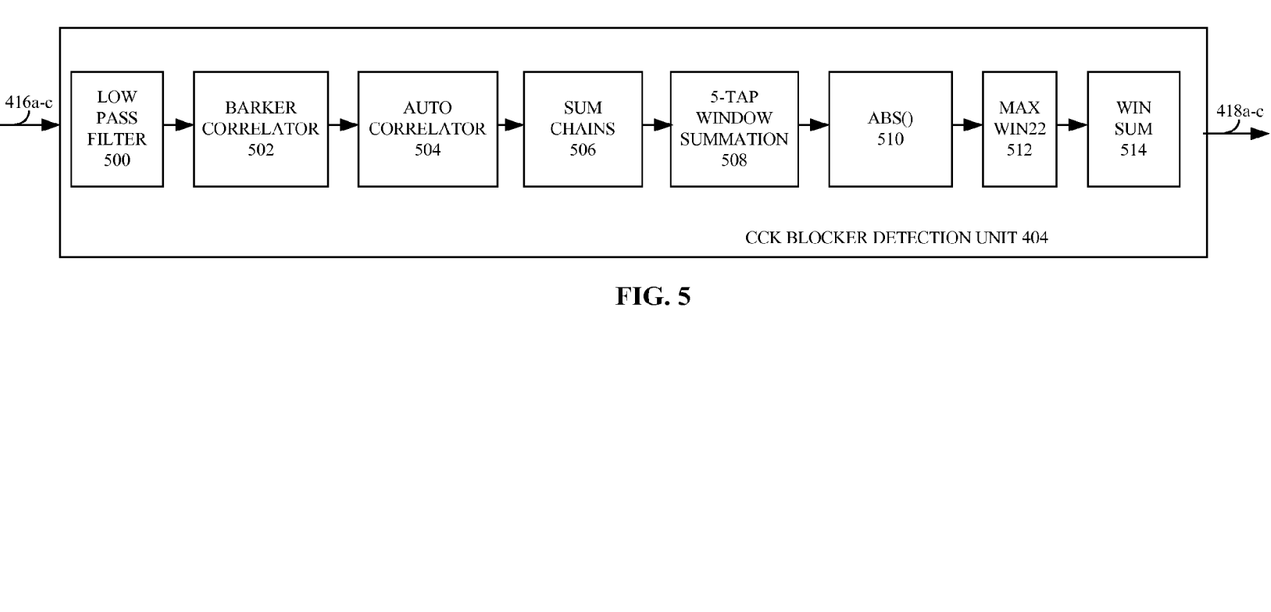
FIG. 5 is an exemplary block diagram of a CCK blocker detection unit shown in FIG. 4.

FIG. 5 illustrates an exemplary block diagram of the CCK blocker detection circuitry 404 in further detail. The amplitude of each frequency-shifted signal (i.e., 0/+5/−5 MHz) is calculated by summing the autocorrelations over all N antennas, the absolute values of the summation of each autocorrelation of each Barker correlation output and gathering a moving sum over a predetermined number of symbols. In an embodiment, this calculation can be performed by the components shown in FIG. 5. The outputs 416a-c of each mixer 414a-c is filtered by a low pass filter 500 to filter out noise in each respective 0/−5/+5 MHz signal. A Barker correlator 502 is used to correlate the signal over a wider frequency band in order for the autocorrelator 504 to detect and reject additional noise in the signal. The autocorrelator 504 only takes the real part of the correlation results. The sum chains circuitry 506 combines equally the real parts of the auto correlation outputs of each receive chain. A five-tap window summation unit 508 is used to collect the multipath power of each receive chain. A abs( ) unit 510 calculates the amplitude of the combined correlation results to remove the preamble data. The max win 22 circuitry 512 is a 22-tap sliding window that determines the maximum value of the summed correlation outputs. The win sum circuitry 514 is a 10-tap sliding window summation with 1 MHz clock rate and outputs a respective power signal 418a-c.

Turning back to FIG. 4, the signals 418a-c are used by the comparison circuitry 406 to determine if the major amplitude of the correlation of the 0 MHz frequency-shifted signal (i.e., baseband signal) is within a predetermined tolerance of the center of the frequency band. The comparison circuitry 406 compares the amplitude of the autocorrelation of the Barker correlation output for the 0 MHz signal relative to the amplitudes of the autocorrelation of the Barker correlation outputs for the +5 MHz and −5 MHz signals. In an embodiment, a CCK blocker is detected if the amplitude of the autocorrelation of the Barker correlation of the 0 MHz signal is less than 1.25 times the amplitude of the autocorrelation of the Barker correlation of the +5 MHz or −5 MHz signal. Turning back to FIG. 3, the not_blocker signal 322 is set accordingly and transmitted to the packet detection circuitry 132 and the weak signal circuitry 318.

Attention now turns to a discussion of the method used by the receiver architecture in operation of the adjacent channel rejection technique.

Figure 6:
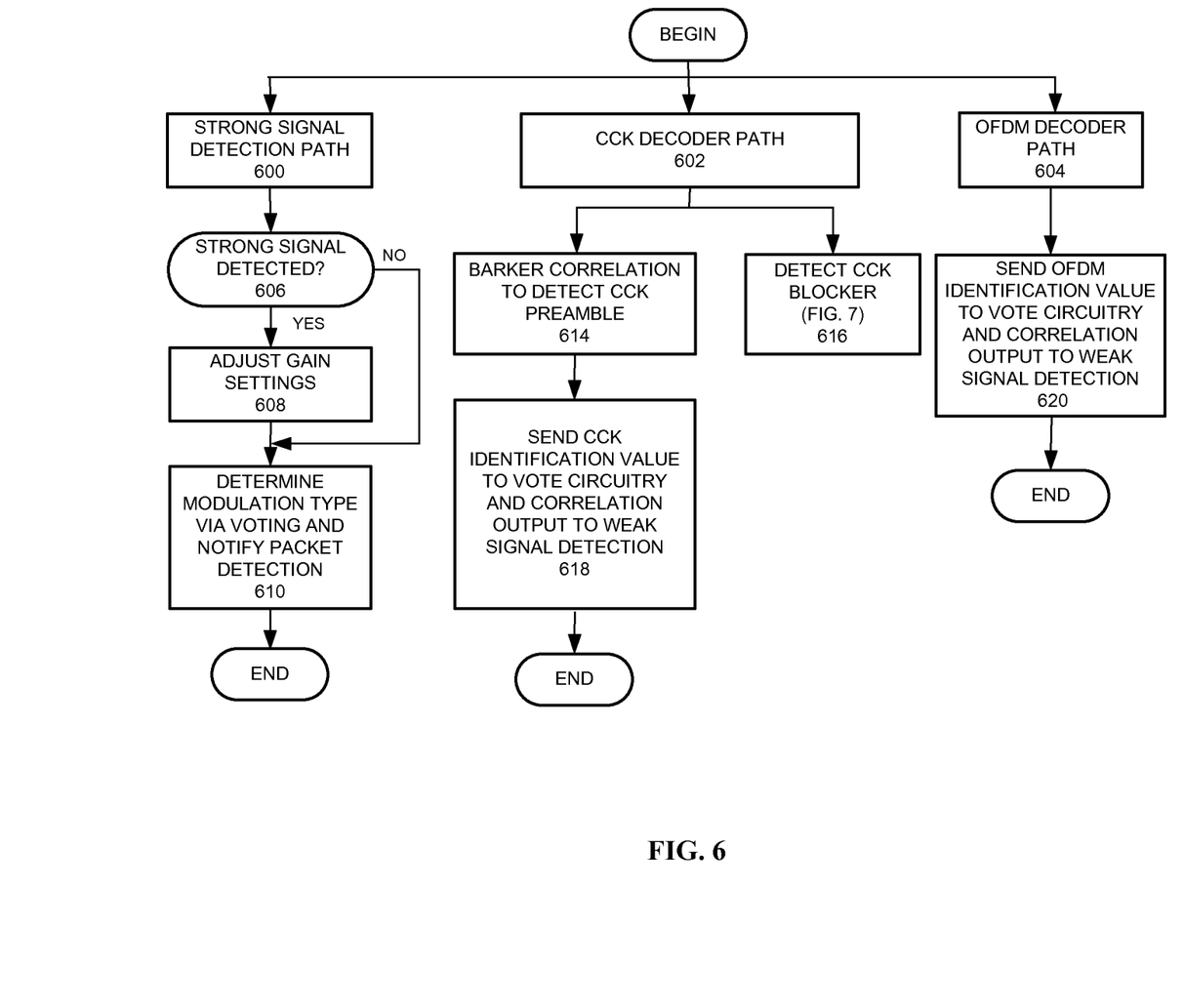
FIG. 6 is an exemplary flow diagram of a method for detecting a signal.

FIG. 6 illustrates an exemplary flow chart of the operation of the adjacent channel rejection technique of a CCK blocker performed by the pre-processing circuitry 130. The processing shown in the flow chart can be performed by a state machine (not shown) or a controller (not shown) within the receiver.

The method is initiated when a search is activated to detect a packet. Different detection mechanisms can be used to detect the start of a packet, such as the strong and weak signal detection techniques described above. Since it is not known whether the next packet will be a strong or weak signal, the detection techniques operate in parallel. Therefore, the output of the FIR 300 is processed by a strong signal detection circuitry 308 (step 600) and two weak signal detectors: the CCK decoder path 304 (step 602); and the OFDM autocorrelation circuitry 316 (step 604).

The strong signal detection circuitry 308 is engaged to detect a large in-band power. In an embodiment, the power detector(s) 134 can detect this increase and provide it to the strong signal detection circuitry 308 (step 606). The in-band power is compared to one or more predetermined thresholds. When the increase exceeds a threshold, a strong signal is detected (step 606—yes) thereby necessitating an adjustment in the gain settings of the variable amplifiers (step 608). Otherwise, if the increase does not exceed the threshold (step 606—no), no adjustment is made in strong signal detection to the gain settings. Once the gain settings settle, the voting circuitry 310 determines the modulation type of the baseband signal based on the identification values computed from the autocorrelation circuitry 316 and the CCK signal detection circuitry 314 (step 610). A signal 320 indicating the modulation type is passed on to the packet detection circuitry 132 (step 610).

The CCK decoder path 602 determines in parallel whether the baseband signal is a CCK-modulated signal (step 614) and a CCK blocker (step 616). The CCK signal detection circuitry 402 correlates the baseband signal with known modulation patterns found in the preamble of a CCK signal (step 614). An identification value based on the maximum RSSI of the Barker correlation is provided to the vote circuitry 310 and the amplitude of the autocorrelation of the Barker correlation output is provided to the weak signal detection circuitry 318 (step 618).

Figure 7:
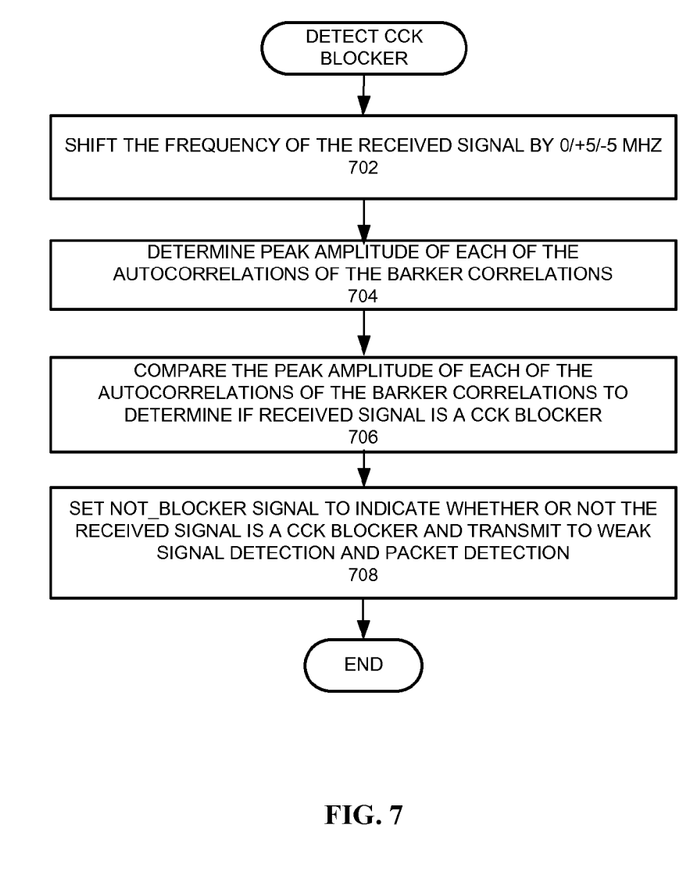
FIG. 7 is an exemplary flow diagram of a method for detecting a CCK blocker signal.

Referring to FIG. 7, there is shown an exemplary flow chart of the method of detecting a CCK blocker performed by the CCK signal detection circuitry 314. The baseband signal is frequency-shifted by 0/+5/−5 MHz respectively (step 702). The amplitude of the autocorrelation of the Barker correlation output of each frequency-shifted signal is determined (step 704) and compared against a predetermined threshold (step 706). In an embodiment, if the amplitude of the autocorrelation of the Barker correlation output of the 0 MHz frequency-shifted signal is greater than both 1.25 times the amplitudes of the autocorrelation of the Barker correlation outputs of the +5 MHz and −5 Mhz signals, the baseband signal is considered a CCK signal and not a CCK blocker (step 706). Otherwise, the baseband signal is considered a CCK blocker (step 706). The not_blocker signal 322 is set accordingly and transmitted to the weak signal detection circuitry 318 and the packet detection circuitry 132 (step 708).

Referring back to FIG. 6 and the OFDM decoder path (step 604), the autocorrelation circuitry 316 uses an autocorrelation technique to decode the baseband signal (step 604). Each sample can be multiplied by the conjugate of a sample of a fixed number of previous samples and summed for a fixed amount of time (step 604). The identification values, based on the maximum RSSI values of the correlation output, are then transmitted to the voting circuitry 310 and the amplitude of the autocorrelation of the Barker correlation output is transmitted to the weak signal detection circuitry 318 (step 620).

Figure 8:
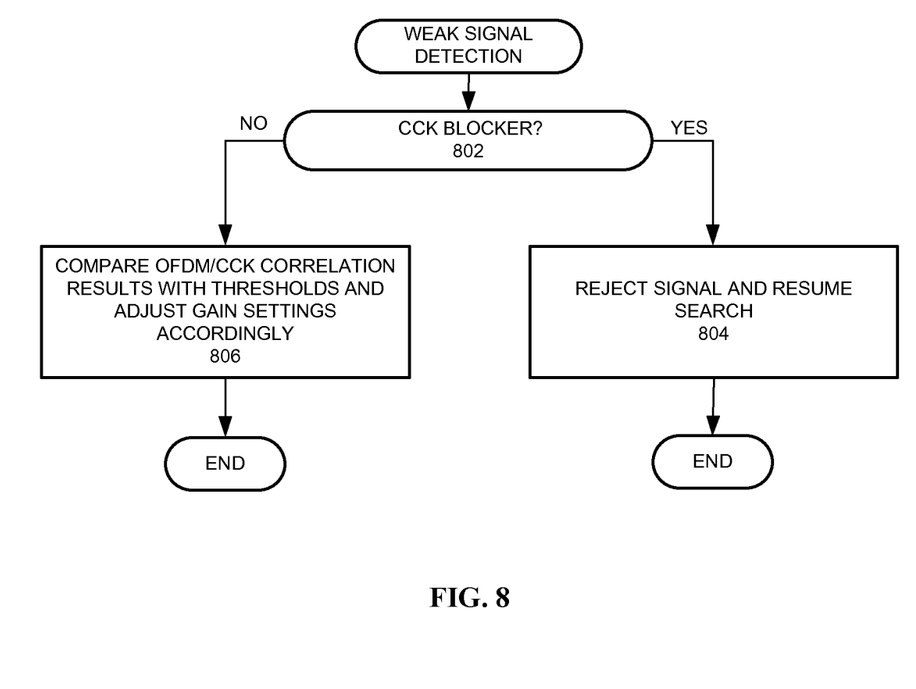
FIG. 8 is an exemplary flow diagram of a method for weak signal detection.

FIG. 8 illustrates an exemplary flow chart of the method of the weak signal detection circuitry 318. If the baseband signal is a CCK blocker (i.e., not_blocker set accordingly) (step 802—yes), then the weak signal detection circuitry 318 does not need to proceed any further. The weak signal detection circuitry 318 rejects the baseband signal and returns to the search state of detecting an incoming signal (step 804). Otherwise, the weak signal detection circuitry 318 compares the OFDM and Barker correlation outputs to respective predetermined thresholds (step 806). If the OFDM correlation output is less than the predetermined OFDM threshold, then there is no need to adjust the gain settings of the variable amplifiers (step 806). Otherwise, if the OFDM correlation output exceeds the predetermined OFDM threshold, fine gain adjustments can be performed on the variable amplifiers (step 806). Likewise, if the CCK correlation output is less than the predetermined CCK threshold, then there is no need to adjust the gain settings of the variable amplifiers (step 806). Otherwise, if the CCK correlation output exceeds the predetermined CCK threshold, fine gain adjustments can be performed on the variable amplifiers (step 806).

Figure 9:
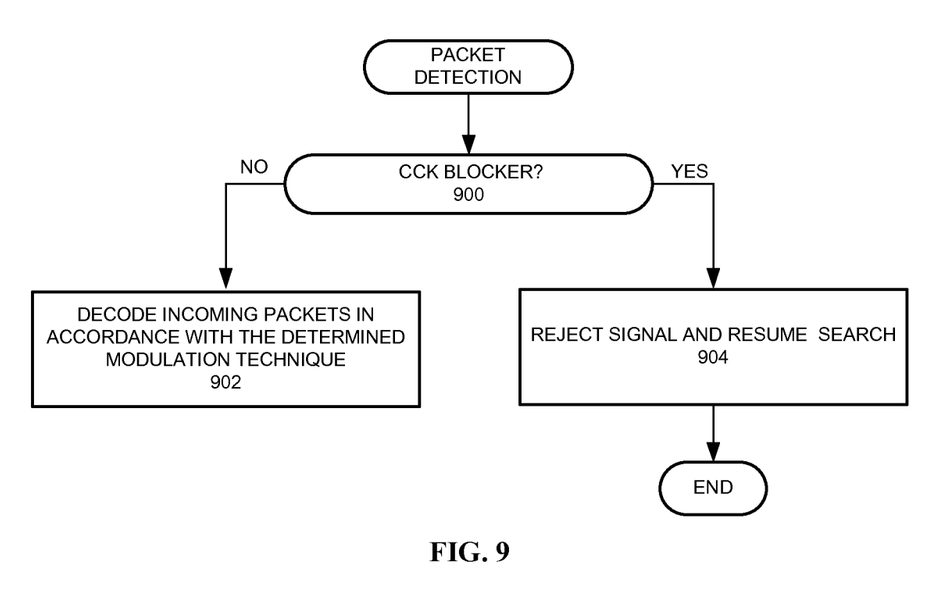
FIG. 9 is an exemplary flow diagram of a method for rejecting a CCK blocker signal in packet detection.

FIG. 9 illustrates an exemplary flow chart of the method of the packet detection circuitry 132. If a CCK blocker has been detected (e.g., not_blocker signal set accordingly) (step 900—yes), then the packet detection circuitry 132 rejects the baseband signal, ceases processing and returns to search for another incoming packet (step 904). The CCK blocker is rejected in packet detection 132 when the CCK blocker is a strong signal. Since the strong signal detection circuitry takes a longer time to process due to time delays attributable to adjustments made to the gain settings of the variable amplifiers, it is often the case that the CCK blocker is not able to reject the CCK blocker earlier.

When a CCK blocker has not been detected (e.g., not_blocker signal set accordingly) (step 900—no), the packet detection circuitry 132 continues to decode the incoming packets utilizing the modulation technique identified by the vote circuitry 310 (step 902).

The foregoing description, for purposes of explanation, has been described with reference to specific embodiments. However, the illustrative teachings above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Although the techniques discussed herein are described with reference to embodiments of a receiver operating in accordance with the IEEE 802.11b, g standards, the techniques are not constrained to these standards and can be applied to other wireless environments, including without limitation other variants of the IEEE 802.11 standards.

In addition, the techniques described herein are described with reference to shifting the frequency of the baseband signal by 0 MHz, +5 MHz, and −5 MHz. However, the techniques described herein are not constrained to these particular frequencies. The selection of frequencies is a design parameter that can vary based on the characteristics of the interfering RF signals. For example, but not by limitation, a receiver, operating within a 2.4 MHz frequency band having 22 MHz channels that are symmetrically located (+/−11 MHz) around a center frequency that are spaced 5 MHz apart may be capable of receiving adjacent channel interference signals from an adjacent +/−5 MHz frequency band. In this situation, the frequency offsets described herein can be used in order to reject interfering signals from these adjacent channels. However, even if the CCK blocker signal is +/−10 MHz, +/−15 MHz, +/−20 MHz or +/−25 MHz away from the center frequency, shifting the frequencies 0 MHz, +5 MHz, and −5 MHz will still detect the CCK blocker by exploiting the side-lobe of the CCK blocker signal.

What is claimed:

1. A method for detecting an adjacent channel interference (ACI) signal in a wireless communications receiver, the method comprising:
   receiving a baseband signal in a first frequency band;
   correlating the baseband signal over a second frequency band;
   determining if power of the baseband signal in the second frequency band is approximately at a center of the second frequency band; and
   identifying the baseband signal as an ACI signal if the power of the baseband signal is not approximately at the center of the second frequency band.

2. The method of claim 1, wherein the correlating step further comprises:
   frequency-shifting the baseband signal by a first frequency offset, and a second frequency offset, thereby generating a first frequency offset signal and a second frequency offset signal.

3. The method of claim 2, wherein the first frequency offset is 5 MHz and the second frequency offset is −5 MHz.

4. The method of claim 2, further comprising:
   correlating each frequency offset signal with the baseband signal.

5. The method of claim 4, wherein the correlating step further comprises:
   performing barker correlation of each frequency offset signal with the baseband signal; and
   autocorrelating each output of the barker correlation of each frequency offset signal to generate a correlation output for each frequency offset signal.

6. The method of claim 5, wherein the determining step further comprises:
   comparing a power of the correlation output of each frequency offset signal to determine if the baseband signal is approximately at the center of the second frequency band.

7. The method of claim 1, wherein the baseband signal is based on one of orthogonal frequency-division multiplexing (OFDM) or complementary code keying (CCK) modulations.

8. The method of claim 1, wherein the baseband signal is a combination of baseband signals received from multiple antennas.

9. A method for detecting an adjacent channel interference (ACI) signal in a wireless communications receiver, the method comprising:
   receiving a baseband signal in a frequency band;
   correlating the baseband signal with a code to provide a first correlation value;
   frequency shifting the baseband signal to create a first frequency shifted baseband signal;
   correlating the first frequency shifted baseband signal with the code to provide a second correlation value;
   determining that power of the baseband signal is not approximately at a center of the frequency band if the first correlation value is less than a first threshold value derived from the second correlation value; and
   identifying the baseband signal as an ACI signal if the power of the baseband signal is not approximately at the center of the frequency band.

10. The method of claim 9, further comprising:
    frequency shifting the baseband signal to create a second frequency shifted baseband signal;
    correlating the second frequency shifted baseband signal with the code to provide a third correlation value; and
    determining that power of the baseband signal is not approximately at the center of the frequency band if the first correlation value is less than a second threshold value derived from the third correlation value.

11. The method of claim 10, wherein the first frequency shifted baseband signal is shifted to a frequency greater than the center of the frequency band, and the second frequency shifted baseband signal is shifted to a frequency less than the center of the frequency band.

12. The method of claim 9, wherein the code comprises a sequence of Barker code words.

13. The method of claim 9, further including a process selected from the group consisting of:
    performing orthogonal frequency-division multiplexing (OFDM) autocorrelation based on the baseband signal, and
    performing strong signal detection based on the baseband signal.

14. The method of claim 9, wherein the baseband signal is a combination of baseband signals received from multiple antennas.

15. A wireless communications receiver, comprising:
    a first correlator coupled to receive a baseband signal in a frequency band, wherein the first correlator correlates the baseband signal with a code to provide a first correlation value;
    a first frequency-shifting mechanism that shifts the baseband signal by a first frequency offset, thereby generating a first frequency-shifted signal;
    a second correlator coupled to receive the first frequency-shifted signal, wherein the second correlator correlates the first frequency-shifted signal with the code to provide a second correlation value; and
    a comparison unit that determines that power of the baseband signal is not approximately at a center of the frequency band if the first correlation value is less than a first threshold value derived from the second correlation value, and identifies the baseband signal as an adjacent channel interference (ACI) signal if the power of the baseband signal is not approximately at the center of the frequency band.

16. The wireless communications receiver of claim 15, further comprising:
    a second frequency-shifting mechanism that shifts the baseband signal by a second frequency offset, thereby generating a second frequency-shifted signal; and
    a third correlator coupled to receive the second frequency-shifted signal, wherein the third correlator correlates the second frequency-shifted signal with the code to provide a third correlation value,
    wherein the comparison unit determines that power of the baseband signal is not approximately at the center of the frequency band if the first correlation value is less than a second threshold value derived from the third correlation value.

17. The wireless communications receiver of claim 16, wherein the first frequency-shifted baseband signal is shifted to a frequency greater than the center of the frequency band, and the second frequency-shifted baseband signal is shifted to a frequency less than the center of the frequency band.

18. The wireless communications receiver of claim 15, further comprising orthogonal frequency-division multiplexing (OFDM) autocorrelation circuitry coupled to receive the baseband signal.

19. The wireless communications receiver of claim 15, further comprising strong signal detection circuitry coupled to receive the baseband signal.

20. The wireless communications receiver of claim 15, further comprising multiple antennas configured to receive baseband signals that are combined to form the baseband signal.

* * * * *